(12) United States Patent
Ito et al.

(10) Patent No.: US 7,717,213 B2
(45) Date of Patent: May 18, 2010

(54) MOTORCYCLE

(75) Inventors: Shinji Ito, Saitama (JP); Toshiyuki Iwai, Saitama (JP); Toshihiko Ichikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 11/898,901

(22) Filed: Sep. 17, 2007

(65) Prior Publication Data

US 2008/0066987 A1  Mar. 20, 2008

(30) Foreign Application Priority Data

Sep. 20, 2006  (JP) .............................. 2006-254862

(51) Int. Cl.
  *B62K 11/02*  (2006.01)
(52) U.S. Cl. ...................... 180/227; 180/219; 180/226
(58) Field of Classification Search ................ 180/227, 180/226, 219
  See application file for complete search history.

(56) References Cited

U.S. PATENT DOCUMENTS

| 2,077,628 | A | * | 4/1937 | Jordan | 180/226 |
| 4,327,812 | A | * | 5/1982 | Tominaga et al. | 180/226 |
| 4,427,088 | A | * | 1/1984 | Tsuboi | 180/219 |
| 4,434,868 | A | * | 3/1984 | Brenner et al. | 180/226 |
| 5,067,580 | A | * | 11/1991 | Parker | 180/219 |
| 6,932,178 | B2 | * | 8/2005 | Soatti | 180/226 |
| 7,419,028 | B2 | * | 9/2008 | Yamakura et al. | 180/291 |
| 7,510,040 | B2 | * | 3/2009 | Takayanagi et al. | 180/226 |
| 2007/0095591 | A1 | * | 5/2007 | Takayanagi et al. | 180/226 |
| 2007/0199756 | A1 | * | 8/2007 | Kofuji | 180/226 |
| 2008/0006464 | A1 | * | 1/2008 | Utsumi et al. | 180/226 |

FOREIGN PATENT DOCUMENTS

| JP | 62043388 A | 2/1987 |
| JP | 2000-238544 A | 9/2000 |

* cited by examiner

*Primary Examiner*—Lesley Morris
*Assistant Examiner*—Michael R Stabley
(74) *Attorney, Agent, or Firm*—Birch, Stewart, Kolasch & Birch, LLP

(57) ABSTRACT

A motorcycle is provided with a rear fork attached to a body frame so as to swing up and down freely. A rear wheel is attached to the rear end portion of the rear fork, a gear case is attached to a side of the rear wheel, and a drive shaft is provided between the gear case and an output shaft of a power unit. The output of the power unit is transmitted to the rear wheel via the drive shaft and the gear case. In the motorcycle, the gear case is supported by a rear-wheel axle provided in the rear end portion of the rear fork. A torque rod, which links an outer periphery portion of the gear case with the rear fork, serves as a stopper for rotation of the gear case. The resulting configuration provides a shaft-drive system that reduces the assembling time of the torque rod, and improves the productivity of the main line.

20 Claims, 6 Drawing Sheets

EMBODIMENT

COMPARATIVE EXAMPLE

MOTORCYCLE

CROSS-REFERENCE TO RELATED APPLICATION

The present application claims priority under 35 U.S.C. §119 to Japanese Patent Application No. 2006-254862, filed Sep. 20, 2006, the entire contents of which are hereby incorporated by reference.

BACKGROUND OF THE INVENTION

1. Field of the Invention

The present invention relates to a motorcycle equipped with a shaft-drive system for transmitting the output of a power unit to a rear wheel.

2. Description of Background Art

A motorcycle equipped with a shaft-drive system for transmitting the output of a power unit to a rear wheel via a drive shaft and a gear case is known by the disclosure of, for example, Japanese Unexamined Patent Application Publication No. Sho 62-43388 (FIG. 1 and FIG. 2).

A motorcycle 1 shown in FIG. 1 and FIG. 2 of the above-mentioned document (the reference numerals used in this and the next paragraphs are of the cited document) is a vehicle that includes: a frame 2; a rear fork 10 attached to the frame 2 so as to swing up and down freely; a rear wheel 11 attached to the rear end portion of the rear fork 10 so as to rotate freely; a gear case 15 provided at a side of the rear wheel 11; a propeller shaft 28 (hereinafter referred to as drive shaft 28) provided between the gear case 15 and a shaft 24 of an engine; and a torque rod 32 provided between the gear case 15 and the frame 2. The driving power is transmitted from the engine to the rear wheel 11 via the drive shaft 28 and the gear case 15.

In the motorcycle 1 of the above-mentioned document, an end 32b of the torque rod 32 is joined to the frame 2, so that the assembling work of the torque rod 32 to the frame 2 has to be done in the main line. As a result, the more time the assembling work of the torque rod 32 takes, the lower the productivity of the main line becomes.

SUMMARY AND OBJECTS OF THE INVENTION

An object of the present invention is to provide a motorcycle equipped with a shaft-drive system that accomplishes a shorter assembling time of the torque rod and a higher productivity of the main line.

According to a first aspect of the present invention, a motorcycle includes a rear fork attached to a body frame so as to swing up and down freely. A rear wheel is attached to a rear end portion of the rear fork. A gear case is attached to a side of the rear wheel. A drive shaft is provided between the gear case and an output shaft of a power unit. The output of the power unit is transmitted to the rear wheel via the drive shaft and the gear case. The gear case is supported by a rear-wheel axle provided in the rear end portion of the rear fork. A torque rod, which links an outer periphery portion of the gear case with the rear fork, serves as a stopper for rotation of the gear case.

According to a second aspect of the present invention, the torque rod is joined to any one of the rear fork and the gear case, with an elastic member placed in between.

A meshing position, a joining position and a position of bearing are defined as follows. The meshing position is a position where a gear of the drive-shaft side placed in the gear case meshes with a final driven gear of the rear-wheel side. The joining position is a position where the torque rod is joined to the gear case. The position of bearing is a position of a bearing that is placed in the gear case to support the final driven gear.

According to a third aspect of the present invention, the meshing position, the joining position and the position of bearing thus defined are arranged substantially in a single vertical plane.

Effects of the Invention Include the Following:

In the first aspect of the present invention, an end of the torque rod is assembled to the rear fork. Accordingly, the rear wheel, the gear case, and the torque rod can be assembled to the rear fork all at once, and thus, the assembling of the torque rod to the rear fork can be done in advance in the sub line. The torque rod does not have to be assembled to the rear fork in the main line, which results in a higher productivity of the main line.

In addition, the assembling work of the torque rod to the rear fork done in the sub line facilitates a favorable work posture, and thus requires a shorter assembling time of the torque rod.

In the second aspect of the present invention, the torque rod is joined either to the rear fork or to the gear case, with the elastic member placed in between. Accordingly, the elastic member can absorb a shock that derives from the fluctuation of the torque transmitted through the power train. Now that the elastic member can absorb the shock that derives from the fluctuation of the transmitted torque, another buffering system provided in another portion against the shock, such as a damper member provided in the gear case, can be made smaller in size, or such a buffering system in another portion can be eliminated altogether.

In the third aspect of the present invention, the three positions—the meshing position of the gear of the drive-shaft side with the final driven gear, the joining position of the torque rod to the gear case, and the position of the bearing supporting the final driven gear—are arranged in the same vertical plane. Accordingly, force acting on the meshing position is less likely to produce a torsion moment in the gear case.

Since the torsion moment is less likely to generate in the gear case, the gear case needs less strength than in the case where the meshing position, the joining position, and the position of bearing are not arranged in the same vertical plane. Since the gear case needs less strength, it can be made in a smaller wall thickness, and thus can be made lighter in weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
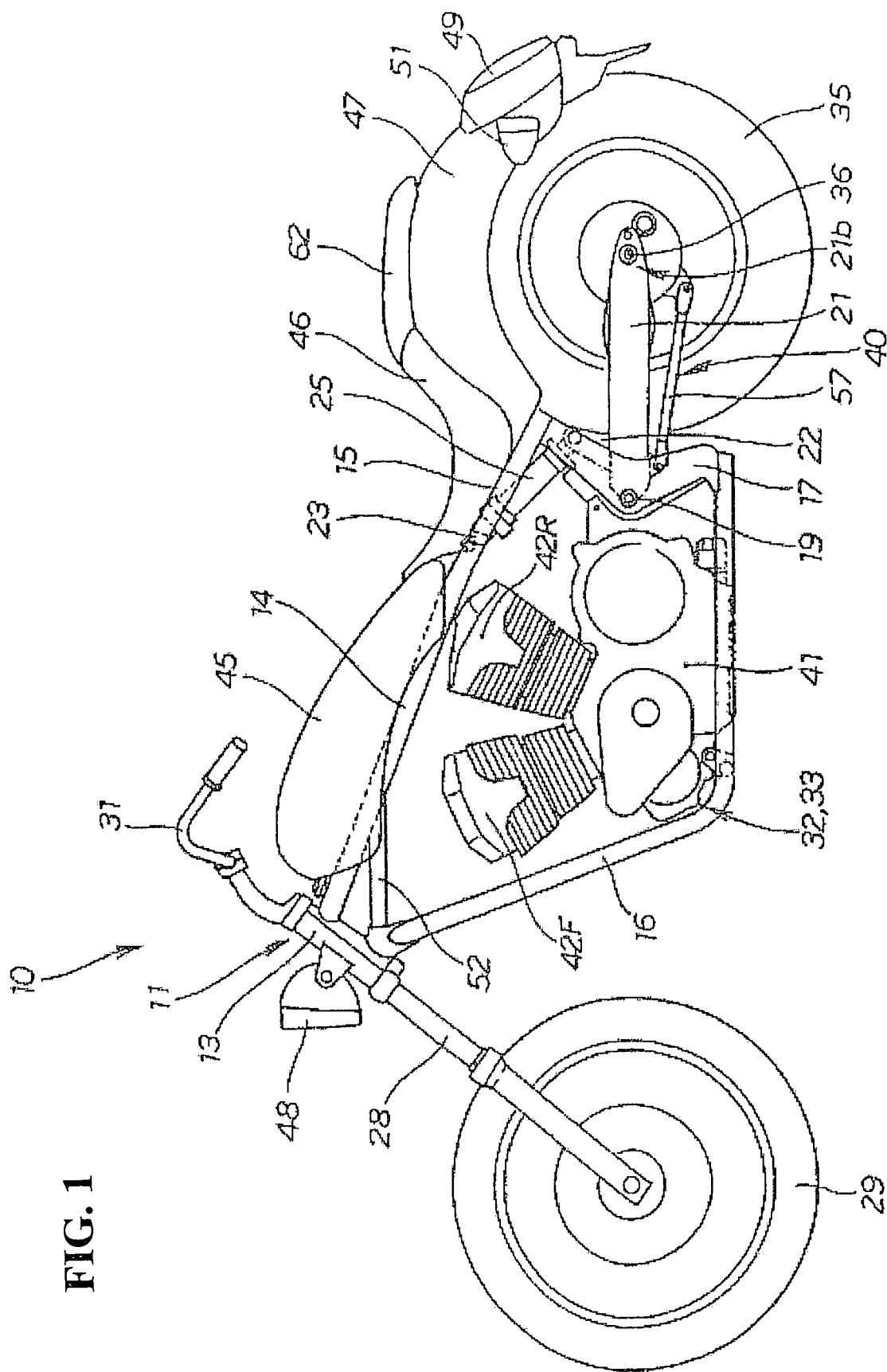
FIG. 1 is a left-side view of a motorcycle according to an embodiment of the invention.

FIG. 1 is a left side view of a motorcycle according to the present invention.

A motorcycle 10 is a vehicle provided with a body frame 11. The body frame 11 is configured as follows. A head pipe 13 is provided in the front end portion of the vehicle, and a main frame 14 extends rearward from the head pipe 13. Seat rails 15, 15 (only the seat rail 15 of the near side is shown in the drawing) extend rearward from the rear end portion of the main frame 14, and down frames 16, 16 (only the down frame 16 of the near side is shown in the drawing) extend obliquely downward from the head pipe 13. Rear frames 17, 17 (only the rear frame 17 of the near side is shown in the drawing) are also provided. Each rear frame 17 links the rear end of each of the down frames 16, 16 with the rear end of the corresponding one of the seat rails 15, 15. A pivot shaft 19 is attached to the rear frames 17, 17 so as to pivot freely, and a rear fork 21 is attached to the pivot shaft so as to swing up and down freely about the pivot shaft 19. Furthermore, a rear cushion unit 25 links a front portion 22 of the rear fork 21 and a rear portion 23 of the main frame 14.

In the motorcycle 10, a steerable front fork 28 is attached to the head pipe 13. While a rotatable front wheel 29 is attached to the lower end of the front fork 28, a steering handle bar 31 is attached to the upper portion of the front fork 28. An engine 33 as a power unit 32 is placed in a space surrounded by the main frame 14 and the down frame 16. A rear wheel 35 is attached to a rear end portion 21b of the rear fork 21 and is allowed to freely move rotatingly. A shaft-drive system 40 is placed between a rear-wheel axle 36, which supports a rear wheel 35, and the engine 33 to transmit the driving power of the engine 33 to the rear wheel 35.

The engine 33 is a V-type two-cylinder engine, and includes a crankcase 41 and two cylinder portions 42F and 42R, which stand up from the crankcase 41. A fuel supply system, an exhaust pipe, a muffler and the like are omitted from the drawing.

Members also shown in FIG. 1 are a fuel tank 45, a driver's seat 46, a rear fender 47, a headlight 48, a tail light 49, rear turn signals 51, 51 (only the rear turn signal 51 of the near side is shown in the drawing), and a gusset member 52 for reinforcing the body frame 11.

Figure 2:
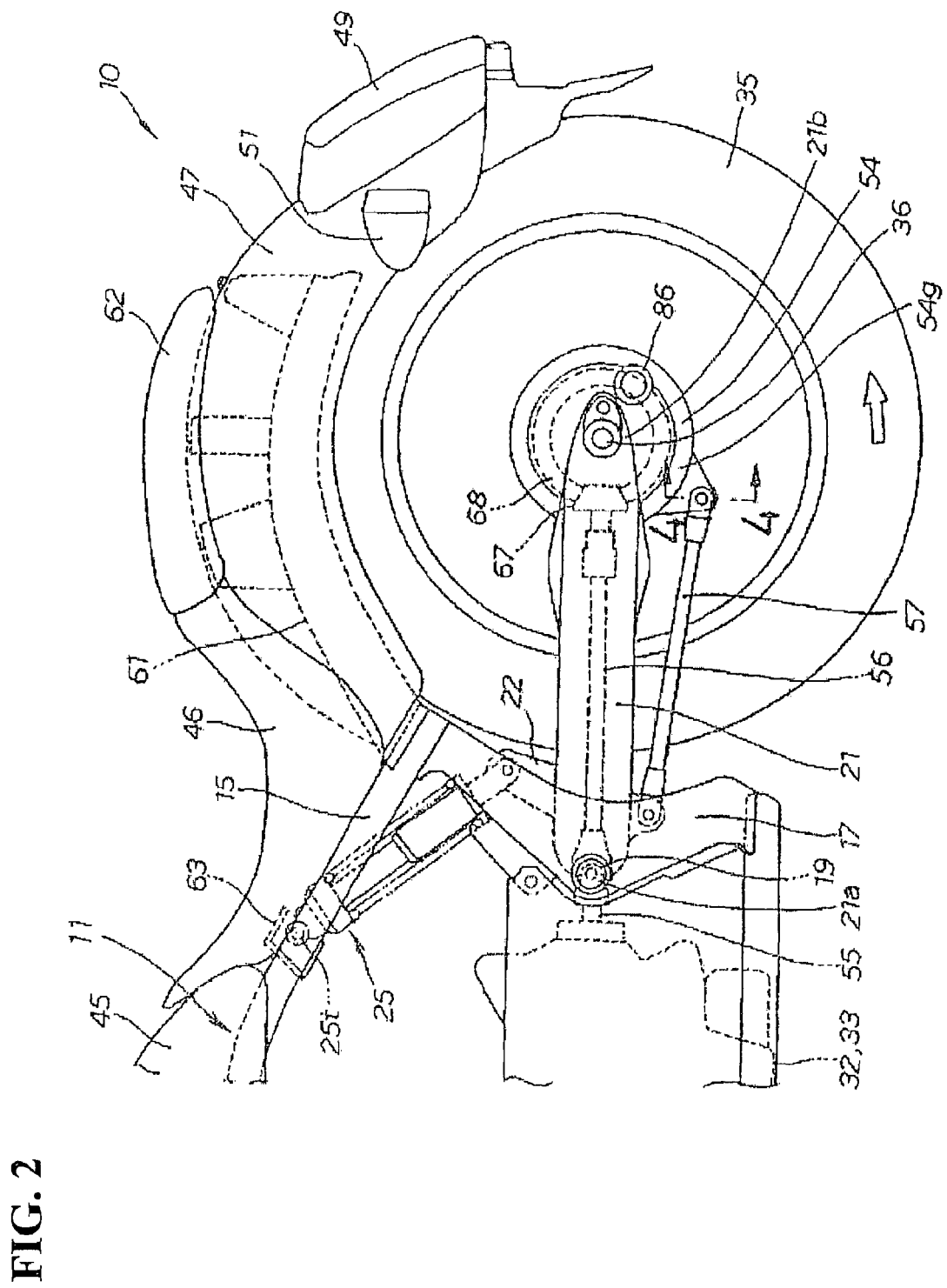
FIG. 2 is a left-side view of a rear portion of the motorcycle according to the embodiment of the invention.

FIG. 2 is a left side view of the rear portion of the motorcycle according to the invention.

In the motorcycle 10, the rear fork 21 is attached to, while extending rearward from, the rear frame 17, which forms a part of the body frame 11, with the pivot shaft 19 placed in between, and thus, the rear fork 21 swings up and down freely. The rear wheel 35 is attached to the rear end portion 21b of the rear fork 21, and at a side of the rear wheel 35, a gear case 54 is provided. A drive shaft 56 is provided between the gear case 54 and an output shaft 55 of the engine 33 as the power unit 32. The output of the engine 33 is transmitted to the rear wheel 35 via the drive shaft 56 and the gear case 54.

The gear case 54 is supported by the rear-wheel axle 36 provided in the rear end portion 21b of the rear fork 21. A torque rod 57, which links an outer peripheral portion 54g of the gear case 54 with the rear fork 21, stops the rotation of the gear case 54.

A rear-portion frame 61 extends rearward from the seat rails 15, 15 (only the seat rail 15 of the near side is shown in the drawing), and the rear fender 47 and a pillion seat 62 are attached to the rear-portion frame 61.

Shown in the drawing, is a bracket 63 provided to the rear portion of the main frame 14 to hold an upper end portion 25t of the rear cushion unit 25.

Figure 3:
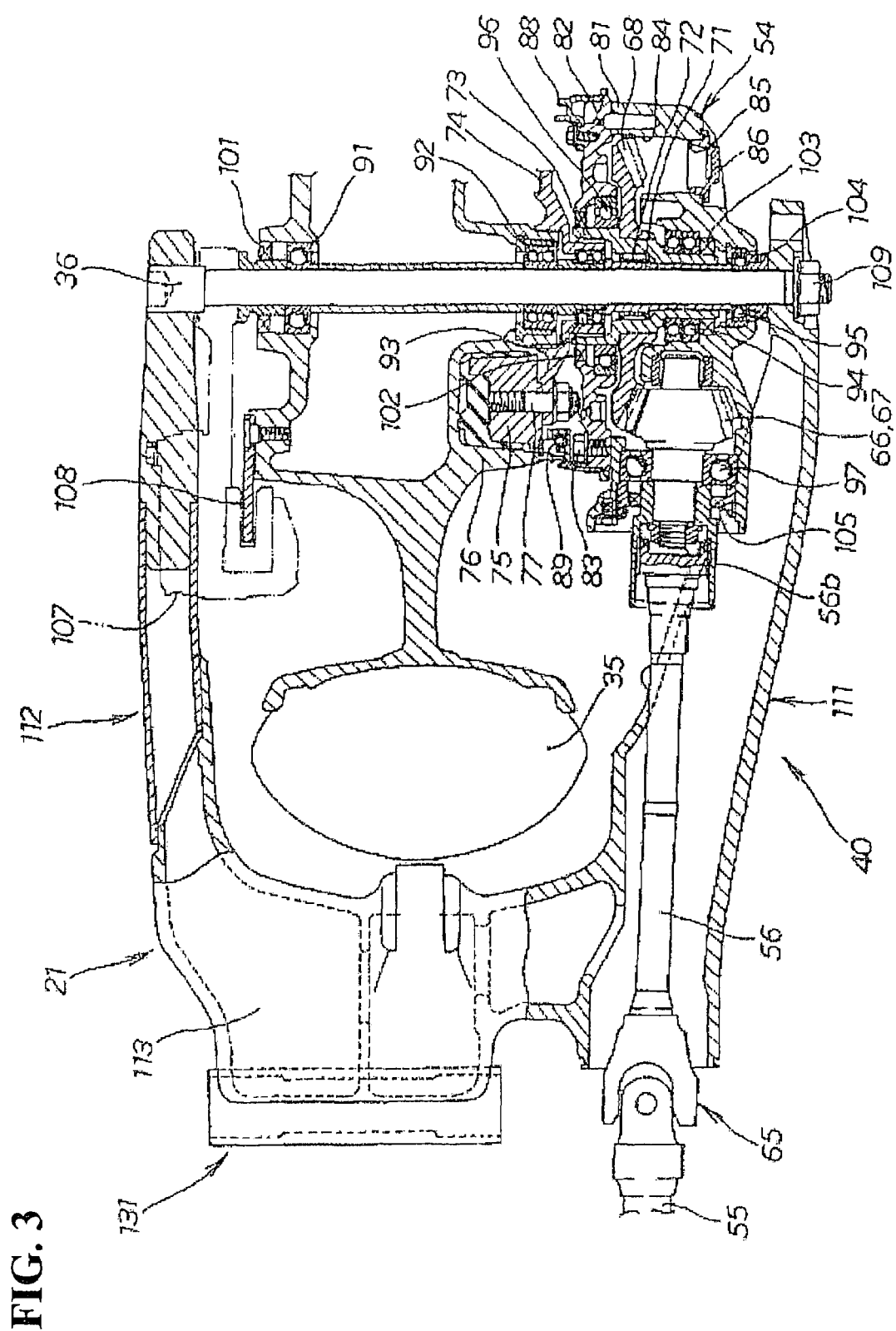
FIG. 3 is a cross sectional view for describing a shaft-drive system and a portion around the system of the motorcycle according to the embodiment of the invention.

FIG. 3 is a cross sectional view for describing the shaft-drive system and the portion around the shaft-drive system of the motorcycle according to the invention. What follows are, firstly, a description on the structure of the shaft-drive system 40, and then a description on the rear fork 21, which supports the shaft-drive system 40 and the rear wheel 35.

The shaft-drive system 40 transmits, while changing the direction of, the driving power of the drive shaft 56 to the rear wheel 35. Principal components of the shaft-drive system 40 include the drive shaft 56 attached to the output shaft 55 of the engine (denoted by the reference numeral 33 in FIG. 2) with a universal joint 65. Also included are a drive gear 67 and a final driven gear 68. The drive gear 67, as a gear 66 of the drive-shaft side, is attached to a rear end portion 56b of the drive shaft 56. The final driven gear 68 meshes with the drive gear 67, and thus the direction of the driving power is changed. The gear case 54, which accommodates the gears 67 and 68, is also a principal component of the system 40.

The final driven gear 68 is press-fitted onto a sleeve 73, which is supported by bearings 94, 96. A damper retainer 74 is attached to, and rotates together with, the sleeve 73 while a damper member 75 is attached to the damper retainer 74 with a bolt 77.

A bearing 72 is disposed on the outer circumference of the rear-wheel axle 36 with a spacer 71 interposed in between. The bearing 72 and another bearing 95 support the final gear unit including the gear case 54.

A buffering system is provided between the final driven gear 68 and the rear wheel 35. In this embodiment, the damper member 75 serves as the buffering system. The damper member 75, which is interposed between the final driven gear 68 and a hub 76 of the rear wheel 35, mitigates the shock that derives from the fluctuation of the torque while the torque is transmitted from the drive shaft 56 to the rear wheel 35.

The gear case 54 includes a main body portion 81 and a lid portion 82, which covers the main body portion 81 from the inner side of the vehicle towards the outer side thereof. The lid portion 82 is put on the main body 81, and then they are fixed together with a fastening member 83. Thus, a gear chamber 84 is formed inside the gear case 54, and the drive gear 67 and the final driven gear 68, which meshes with the drive gear 67, are placed in the gear chamber 84. An oil inlet port 85 is formed in the gear chamber 84, and allows oil to enter the gear chamber 84. A cap 86 usually closes the oil inlet port 85.

A ring member 88 as a dust-guard plate is attached to the lid portion 82 from the inner side of the vehicle while a breather tube 89, which allows the gear chamber 84 to communicate to the atmosphere, is attached to the ring member 88.

Some of the other members shown in FIG. 3 include bearings 91 to 94, 96 and 97, seal members 101 to 105, a disc-brake unit 107, a disc-brake plate 108, and a nut 109 for fixing the rear-wheel axle 36 to the rear fork 21.

The rear fork 21 includes a first extending portion 111, a second extending portion 112, and a cross portion 113, which links the first and the second extending portions 111 and 112.

The first extending portion 111 and the cross portion 113 are integrally formed by casting while the second extending portion 112 is formed by joining a pipe member 131 and a solid member 132 together.

As described above, the rear fork 21 is formed by joining a plurality of members together by welding. A separable structure of the rear fork 21 facilitates the casting of the first extending portion 111 and the cross portion 113.

Figure 4:
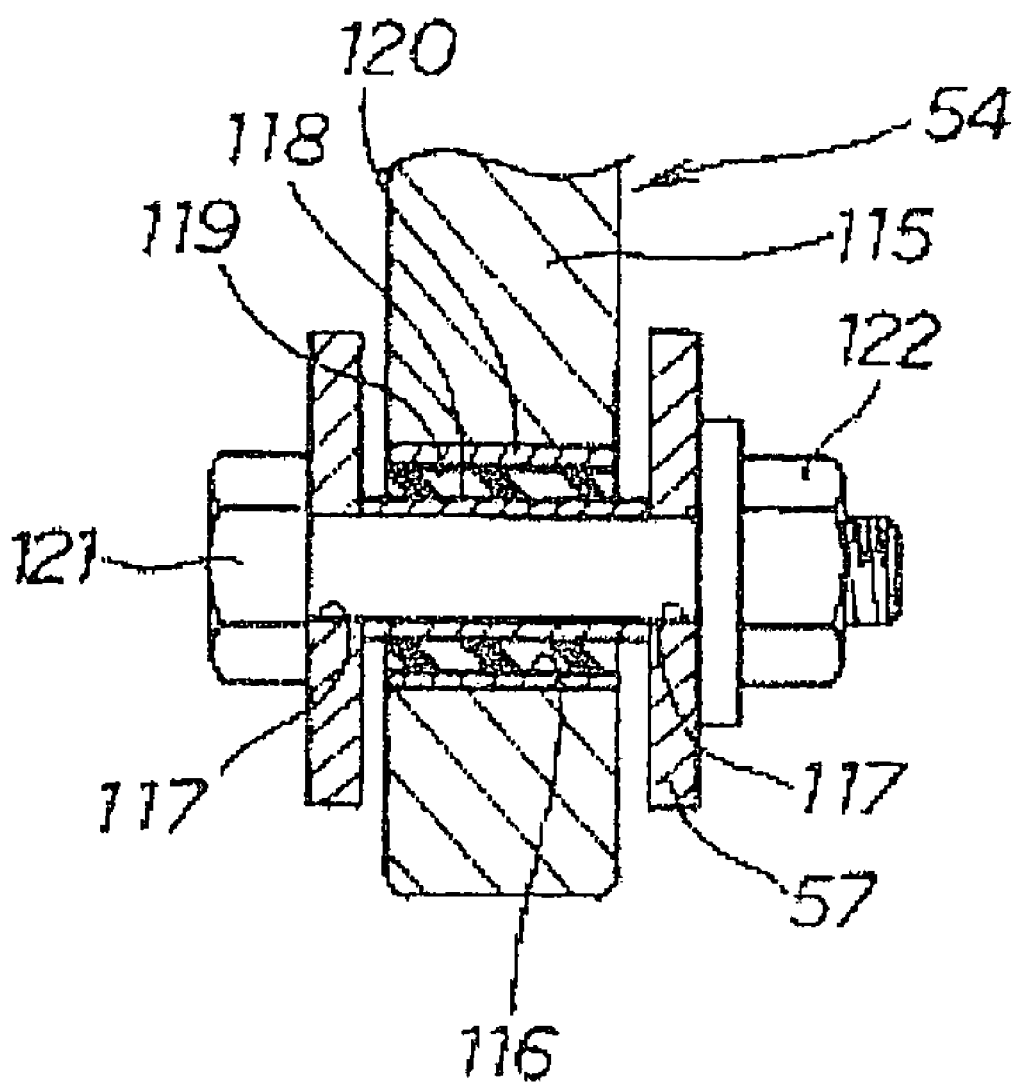
FIG. 4 is a cross sectional view taken along the line 4-4 in FIG. 2.

FIG. 4 is a cross sectional view taken along the line 4-4 in FIG. 2, and at the same time, an explanatory view for describing the structure of attaching the torque rod 57 to the gear case 54.

A flange portion 115 is formed as extending downward from the outer peripheral portion 54g of the gear case 54, and a hole 116 is formed in the flange portion 115. A pipe 120, an elastic member 119, and a pipe member 118 are fitted into the hole 116 in this order. Openings 117, 117 which are respectively formed in bifurcated end portions of the torque rod 57, are aligned with the center of the hole 116, and the torque rod 57 is fastened to the gear case 54 with a bolt 121 and a nut 122.

As described above, the torque rod 57 is joined to the gear case 54 with the elastic member 119 placed in between. The elastic member 119 placed in the joint between the torque rod 57 and the gear case 54 can absorb the shock that the power train generates. Now that the generated shock can be absorbed by the elastic member 119, another buffering system provided another part of the vehicle, such as a damper member (the damper member 75 in FIG. 3) provided in the hub 76 of the rear wheel 35, can be made smaller in size, or can be eliminated altogether.

In this embodiment, the elastic member 119 is attached between the torque rod 57 and the gear case 54, but the elastic member 119 may be attached between the torque rod 57 and the rear fork 21.

Next, descriptions will be given as to some of the advantageous effects of the above-described shaft-drive system for motorcycles.

Figure 5A:
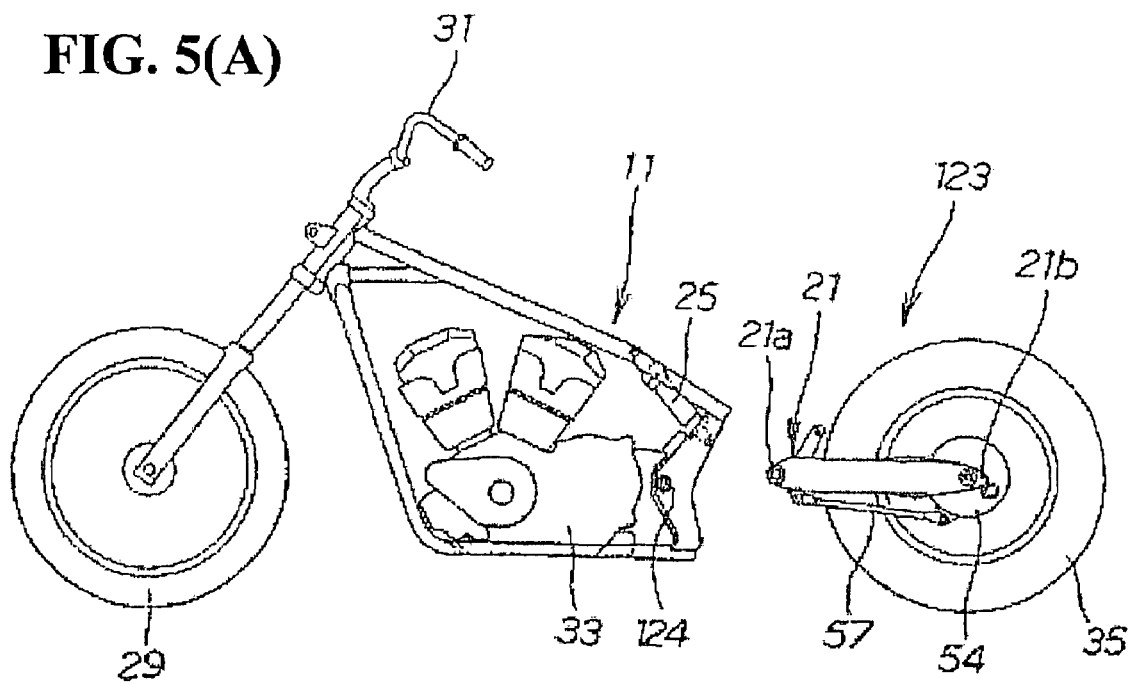
FIGS. 5A and 5B are views for describing the assembling operation of a rear fork to a body frame.
Figure 5B:
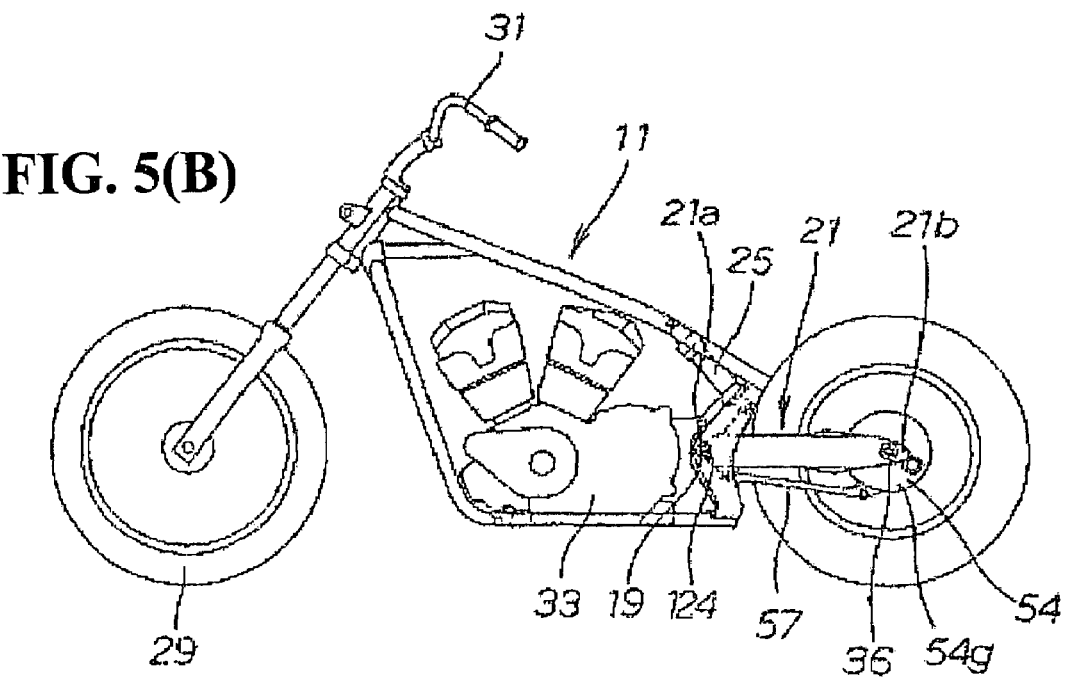

FIGS. 5A and 5B describe the assembling operation of the rear fork to the body frame.

As shown in FIG. 5A, a rear unit 123, which is formed by assembling, in advance, the gear case 54, the rear wheel 35, the torque rod 57 and the like to the rear fork 21 in the sub line, is placed as facing the body frame 11, on which the engine 33 and the like are mounted.

As shown in FIG. 5B, in the main line, a front end portion 21a of the rear fork 21 is aligned with a pivot hole 124 formed in the body-frame 11 side, and then the pivot shaft 19 is inserted into the pivot hole 124. Thus, the rear unit 123 is assembled to the body frame 11.

The gear case 54 is supported by the rear-wheel axle 36 provided in the rear end portion 21b of the rear fork 21. The torque rod 57, which links the outer peripheral portion 54g of the gear case 54 with the rear fork 21, stops the rotation of the gear case 54.

An end of the torque rod 57 is assembled to the rear fork 21. Thus, the rear wheel 35, the gear case 54, and the torque rod 57 can be assembled to the rear fork 21 all at once. Accordingly, the torque rod 57 can be assembled, in advance, to the rear fork 21 in the sub line.

In addition, the assembling of the torque rod 57 to the rear fork 21 in the sub line facilitates a favorable work posture, and thus, shortens the assembling time of the torque rod 57.

Figure 6A:
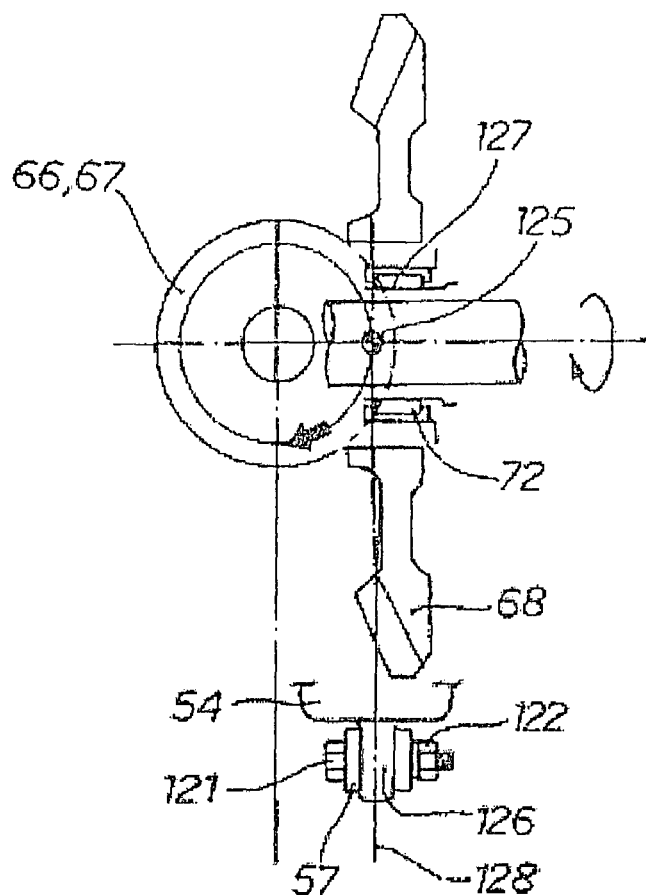
FIG. 6A shows the positional relationships among a meshing position of gears, a joining position of a torque rod, and a position of a bearing of an example of the embodiment of the invention.
Figure 6B:
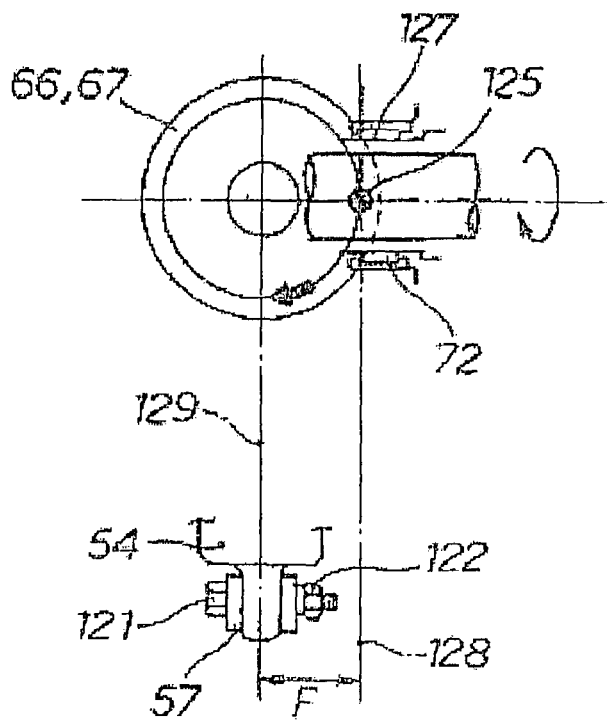
FIG. 6B shows the positional relationships of the comparative example.

FIGS. 6A and 6B are explanatory views for describing the positional relationships among the meshing position of the gears, the joining position of the torque rod, and the position of bearing. FIG. 6A is of an example of the embodiment while FIG. 6B is of a comparative example.

FIG. 6A, which is the view for an example of the embodiment, shows as follows. A meshing position 125 is a position where the drive gear 67 as the gear 66 of the drive-shaft 56 side placed in the gear case 54 meshes with the final driven gear 68 of the rear-wheel 35 side. A joining position 126 is a position where the torque rod 57 is joined to the gear case 54.

A position of bearing 127 is a position of the bearing 72, which is placed in the gear case 54 to support the final driven gear 68. The meshing position 125, the joining position 126, and the position 127 of the bearing are arranged substantially in a single vertical plane 128.

In FIG. 6B, which shows a comparative example, the meshing position 125 and the position 127 of the bearing 72 are arranged substantially in the same vertical plane 128, but the joining position 126 where the torque rod 57 is joined to the gear case 54 is in a different vertical plane 129. The two vertical planes 128 and 129 are apart from each other with a distance F. Accordingly, force acting on the meshing position 125 produces a torsion moment in the gear case 54.

In contrast, in the shaft-drive system 40 according to the embodiment of the invention, with the meshing position 125, the joining position 126, and the position of bearing 127 being arranged substantially in the same vertical plane 128, force acting on the meshing position 125 is unlikely to produce a torsion moment in the gear case 54.

Now that the torsion moment is less likely to generate, less strength is needed to the gear case 54 than in the case where the meshing position 125, the joining position 126, and the position of bearing 127 are arranged in different vertical planes. The gear case 54 that needs less strength can be made in a smaller wall thickness, and thus can be made lighter in weight.

It should be noted that, as to the first aspect of the invention, the elastic member 119 interposed either between the torque rod 57 and the gear case 54 or between the torque rod 57 and the rear fork 21 may be eliminated, and, in addition, that a bearing may replace the elastic member 119.

Moreover, the meshing position 125 where the gear 66 of the drive-shaft 56 side meshes with the final driven gear 68, the joining position 126 where the torque rod 57 is joined to the gear case 54, and the position 127 of the bearing 72 supporting the final driven gear 68 may be arranged in different vertical planes.

The present invention is preferably applied to a motorcycle equipped with a shaft-drive system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a rear fork attached to a body frame so as to swing up and down freely;
   a rear wheel attached to the rear end portion of the rear fork;
   a gear case attached to a side of the rear wheel;
   a drive shaft which is provided between the gear case and an output shaft of a power unit, and which transmits, together with the gear case, an output of the power unit to the rear wheel;
   a rear-wheel axle provided in the rear end portion of the rear fork; and
   a torque rod,
   wherein the gear case is supported by the rear-wheel axle, and
   the torque rod links an outer periphery portion of the gear case with the rear fork, and serves as a stopper for rotation of the gear case.

2. The motorcycle according to claim 1, wherein the torque rod is joined to any one of the rear fork and the gear case, with an elastic member placed in between.

3. The motorcycle according to claim 1, further comprising:
   a meshing position where a gear of a drive-shaft side placed in the gear case meshes with a final driven gear of a rear-wheel side;
   a joining position where the torque rod is joined to the gear case; and
   a position of bearing as a position of a bearing that is placed in the gear case to support the final driven gear,
   wherein the meshing position, the joining position and the position of bearing are arranged substantially in a single vertical plane.

4. The motorcycle according to claim 2, further comprising:
   a meshing position where a gear of a drive-shaft side placed in the gear case meshes with a final driven gear of a rear-wheel side;
   a joining position where the torque rod is joined to the gear case; and
   a position of bearing as a position of a bearing that is placed in the gear case to support the final driven gear,
   wherein the meshing position, the joining position and the position of bearing are arranged substantially in a single vertical plane.

5. The motorcycle according to claim 1, wherein the gear case includes a flange portion extending downwardly from the outer periphery portion thereof, and an end portion of the toque rod is attached to the flange portion.

6. The motorcycle according to claim 1, wherein the gear case includes a flange portion extending downwardly from the outer periphery portion thereof, and a hole is formed in the flange portion,
   wherein the torque rod includes bifurcated end portions with holes, and
   wherein the bifurcated end portions of torque rod are attached to the flange portion of the gear case by a bolt passing through the hole in the flange portion and the holes in the bifurcated end portions.

7. The motorcycle according to claim 3, wherein the joining position is located downwardly with respect to the meshing position.

8. The motorcycle according to claim 4, wherein the joining position is located downwardly with respect to the meshing position.

9. The motorcycle according to claim 3, wherein a center of the gear of the drive-shaft side is disposed further outwardly toward a side of the motorcycle than the meshing position of the gear of the drive-shaft side.

10. The motorcycle according to claim 3, wherein the single vertical plane is disposed closer to the rear wheel than where a center of the gear of the drive-shaft side is disposed.

11. A motorcycle comprising:
    a rear fork attached to a body frame so as to swing up and down freely;
    a rear wheel attached to the rear end portion of the rear fork;
    a gear case attached to a side of the rear wheel;
    a drive shaft which is provided between the gear case and an output shaft of a power unit, and which transmits, together with the gear case, an output of the power unit to the rear wheel;
    a rear-wheel axle provided in the rear end portion of the rear fork; and
    a torque rod,
    wherein the gear case is supported by the rear-wheel axle, and
    the torque rod links an outer periphery portion of the gear case with the rear fork, and serves as a stopper for rotation of the gear case, and
    wherein at least a portion of the drive shaft is housed within the rear fork.

12. The motorcycle according to claim 11, wherein the torque rod is joined to any one of the rear fork and the gear case, with an elastic member placed in between.

13. The motorcycle according to claim 11, further comprising:
    a meshing position where a gear of a drive-shaft side placed in the gear case meshes with a final driven gear of a rear-wheel side;
    a joining position where the torque rod is joined to the gear case; and
    a position of bearing as a position of a bearing that is placed in the gear case to support the final driven gear,
    wherein the meshing position, the joining position and the position of bearing are arranged substantially in a single vertical plane.

14. The motorcycle according to claim 12, further comprising:
    a meshing position where a gear of a drive-shaft side placed in the gear case meshes with a final driven gear of a rear-wheel side;
    a joining position where the torque rod is joined to the gear case; and
    a position of bearing as a position of a bearing that is placed in the gear case to support the final driven gear,
    wherein the meshing position, the joining position and the position of bearing are arranged substantially in a single vertical plane.

15. The motorcycle according to claim 11, wherein the gear case includes a flange portion extending downwardly from the outer periphery portion thereof, and an end portion of the toque rod is attached to the flange portion.

16. The motorcycle according to claim 11, wherein the gear case includes a flange portion extending downwardly from the outer periphery portion thereof, and a hole is formed in the flange portion,
    wherein the torque rod includes bifurcated end portions with holes, and
    wherein the bifurcated end portions of torque rod are attached to the flange portion of the gear case by a bolt passing through the hole in the flange portion and the holes in the bifurcated end portions.

17. The motorcycle according to claim 13, wherein the joining position is located downwardly with respect to the meshing position.

18. The motorcycle according to claim 14, wherein the joining position is located downwardly with respect to the meshing position.

19. The motorcycle according to claim 13, wherein a center of the gear of the drive-shaft side is disposed further outwardly toward a side of the motorcycle than the meshing position of the gear of the drive-shaft side.

20. The motorcycle according to claim 13, wherein the single vertical plane is disposed closer to the rear wheel than where a center of the gear of the drive-shaft side is disposed.

* * * * *